US005590525A

United States Patent [19]

Kandil

[11] Patent Number: 5,590,525

[45] Date of Patent: Jan. 7, 1997

[54] METHOD OF PREVENTING CAVITATION IN AN AXIAL PISTON PUMP DURING AN AIDING LOAD AND SYSTEM AND VALVE EMPLOYING THE SAME

[75] Inventor: Magdy A. Kandil, Milford, N.J.

[73] Assignee: Sundstrand Corporation, Rockford, Ill.

[21] Appl. No.: 70,272

[22] Filed: Jun. 1, 1993

[51] Int. Cl.$^6$ .......... F16D 31/02; F16D 39/00

[52] U.S. Cl. .......... 60/460; 60/468; 60/487; 60/494

[58] Field of Search .......... 60/487, 489, 494, 60/464, 468, 460, 466; 137/166.5, 102, 116.3

[56] References Cited

U.S. PATENT DOCUMENTS

| | | | |
|---|---|---|---|
| 2,845,901 | 9/1953 | MacDuff . | |
| 2,980,136 | 4/1961 | Krehbiel | 137/622 |
| 3,465,520 | 9/1969 | Hann | 60/464 |
| 3,625,007 | 12/1971 | Herndon | 60/105 |
| 3,946,562 | 3/1976 | Ross | 60/464 |
| 4,215,546 | 8/1980 | Hager et al. | 60/487 X |
| 4,371,318 | 2/1983 | Kime | 60/464 X |
| 4,452,267 | 6/1984 | Ott et al. | 137/116.5 |
| 4,625,750 | 12/1986 | Scholz | 137/116.5 |
| 4,768,340 | 9/1988 | Hamilton . | |
| 4,845,948 | 7/1989 | Tha et al. | 60/464 X |
| 4,936,095 | 6/1990 | Ross et al. | 60/468 X |
| 5,025,626 | 6/1991 | Crosser et al. | 60/460 |
| 5,036,659 | 8/1991 | Gillingham et al. | 60/468 X |

FOREIGN PATENT DOCUMENTS

| | | | |
|---|---|---|---|
| 1466470 | 12/1965 | France . | |
| 2182468 | 7/1973 | France . | |
| 915519 | 6/1954 | Germany . | |
| 4119333 | 12/1992 | Germany | 60/466 |

*Primary Examiner*—Hoang Nguyen
*Attorney, Agent, or Firm*—Sundstrand Corporation Intellectual Property Law Department

[57] ABSTRACT

Cavitation in axial piston motors (20) caused to act as a pump by an aiding load (28), and the related difficulty of loss of hydrostatic film (52), and tipping or hammering of motor slippers (64), can be reduced by a method which includes the step of recirculating hydraulic fluid from the supply port (18) of the motor (20) to the return port (30) of the motor (20) upon the occurrence of an aiding load (28).

13 Claims, 4 Drawing Sheets

METHOD OF PREVENTING CAVITATION IN AN AXIAL PISTON PUMP DURING AN AIDING LOAD AND SYSTEM AND VALVE EMPLOYING THE SAME

FIELD OF THE INVENTION

This invention relates to a method for preventing cavitation and associated undesirable occurrences in an axial piston pump during an aiding load condition. It also relates to a hydraulic system that performs the method as well as to a valve that may be incorporated into a hydraulic system to cause the same to perform the method.

BACKGROUND OF THE INVENTION

Two-line hydraulic distribution systems have been widely used in aircraft as a means of minimizing hydraulic system weight. In such a system, one line transmits pressurized hydraulic fluid from the system pump to hydraulic actuators and/or motors in the aircraft which are employed to operate control surfaces, landing gear, etc. The remaining line returns the fluid from the actuators and/or motors to the system reservoir.

Typically, the hydraulic motors employed are axial piston motors, and even more typically, variable displacement, axial piston motors. Regardless, the hydraulic motors or actuators used in the system may be subject to cavitation when an aiding load comes into existence. In this situation, the aiding load tends to drive the hydraulic motor or actuator, thereby converting it into a pump. As a consequence, a low pressure will come into existence at the return port of the motor (which is the suction side of the motor when acting as a pump) or actuator which in turn can cause cavitation to occur. Further, where the motor or actuator is an axial piston motor, there is the additional danger of loss of the hydrostatic film on the wobbler as well as slipper hammering upon the wobbler and tipping of the slipper relative to the wobbler, all of which can accelerate wear.

More specifically, cavitation within the cylinder block bores and conventional kidney plate will occur when the motor return pressure drops to the partial pressure of the hydraulic fluid used in the system. As noted, the problem normally occurs when the motor is backdriven by an aiding load. In such a case, the motor control will force the motor to pump fluid from the return line at low pressure to the supply line at high pressure to absorb the energy provided by the aiding load and protect the motor from over-speeding.

The loss of hydraulic film between the slipper and the wobbler occurs if there is no pressure differential between the motor return pressure and the motor case drain pressure. Further, the lack of such a pressure differential will result in the slippers on the axial pistons tipping (due to centrifical force) and hammering as they return to contact with the wobbler as the pistons cross over from the low pressure or return side of the fluid distribution system to the high or supply pressure side of the motor. As noted, this causes premature wear, particularly of the slippers, and can result in the generation of debris as a result of such wear.

The present invention is directed to overcoming one or more of the above problems.

SUMMARY OF THE INVENTION

One principal object of the invention is the provision of a method for preventing cavitation in a hydraulic actuator when the same is being driven by an aiding load. Another principal object of the invention is to provide a hydraulic system that performs the method. Still another principal object of the invention is the provision of a valve that may be inserted into a hydraulic system so as to cause the same to perform the method.

According to the method of the invention, cavitation is prevented in a hydraulic motor of the axial piston type having a supply port and a return port and which is operable to act as a pump when subject to an aiding load. The method comprises the step of recirculating hydraulic fluid from the supply port to the return port when the motor is subject to an aiding load. In a preferred embodiment, the method includes the additional step of mixing hydraulic fluid from a supply pump with the circulated hydraulic fluid.

In a highly preferred embodiment, the additional step is performed prior to the admission of the recirculated fluid to the return port.

By recirculating fluid from the supply port to the return port during an aiding load situation, there is always sufficient fluid at the return port to prevent the pressure thereat from being reduced to the vapor pressure of the hydraulic fluid. Consequently, cavitation will not occur.

By mixing the recirculating fluid with fluid from the supply, the increase in temperature due to energy imparted to the fluid while being pumped by the motor is offset by "fresh" hydraulic fluid not subject to the temperature increase and coming from the system supply pump. Thermal degrading of the fluid is thus prevented.

According to another facet of the invention, there is provided a hydraulic system that includes a fluid reservoir, a hydraulic supply pump connected to the reservoir, and an axial piston hydraulic motor adapted to drive a load or be driven by a load. The motor includes conventional supply, return and case ports with the supply port being connected to the pump, the case port being connected to the reservoir, and the return port being connectable to the reservoir. Means are provided for preventing cavitation in the motor when the motor is being driven by a load and includes a first means for connecting the return port to the reservoir when pressure at the return port exceeds pressure at the case port by a predetermined amount and second means for connecting the return port to the supply port when pressure at the case port exceeds pressure at the return port.

Preferably, the second means is further operable to connect the return port to the pump when the pressure at the case port exceeds pressure at the return port.

In one embodiment, the first and second means are first and second valves respectively.

In a highly preferred embodiment, the valves are combined in a single structure.

According to one embodiment of the invention, the first valve is a popper having opposed pressure responsive surfaces and the second valve is a spool having opposed pressure responsive surfaces.

A preferred embodiment of the invention contemplates that the spool include a valve seat for the poppet.

In one embodiment of the invention, the spool and poppet may operate to connect both the supply port and the return port to the reservoir.

Preferably, the single structure includes a valve housing having a first port connected to the pump and to the supply port, a second port connected to the return port, and a third port connected to the case port and to the reservoir. A bore is located with the housing and extends to the first, second and third ports. The second valve comprises a hollow spool within the bore and movable between positions blocking and opening the first port to respectively close or open a flow path between the first and second ports. The hollow spool and the bore define a passage within the housing between the second and third ports and the first valve and includes a valve for opening and closing the passage. Means are provided for normally urging the valve to close the passage.

Preferably, the passage includes a valve seat for the valve. The valve seat is preferably located on the spool.

In one embodiment of the invention, the spool further respectively closes or opens a further flow path between the first and third ports and the system further includes a restriction in the further flow path.

According to still another facet of the invention, there is provided a valve which includes a valve body having a bore. First, second and third ports are disposed in the body and open to the bore at spaced locations thereon. A pressure responsive poppet is disposed within the bore and associated with one of the ports for substantially controlling flow out of that port. A pressure responsive spool is located within the bore and is movable to control flow between the other two ports.

In a preferred embodiment, the spool is operative to block, open or meter flow through the second port to both the first and third ports. The spool also has opposed pressure responsive surfaces respectively in communication with the first and third ports.

In a preferred embodiment of the invention, the one port is the first port and the spool is hollow to partially define a flow path between the first and third ports through the spool. The poppet is adjacent the first port and is operative to seal against the spool to close the flow path through the spool.

The invention also contemplates that the spool have a peripheral groove flanked by spaced lands and that the groove be in communication with the hollow in the spool.

In one embodiment of the invention, the spool has one end facing the first port and the hollow in the spool opens to that end. A valve seat is located in such end about the hollow of the spool and the poppet is operable to close against the valve seat on the spool.

In a highly preferred embodiment, the spool has an end opposite the one end and the hollow additionally opens to the opposite end. The opposite end faces the third port and the second port faces the lands and the groove on the spool.

Other objects and advantages will become apparent from the following specification taken in connection with the accompanying drawings.

DESCRIPTION OF THE PREFERRED EMBODIMENTS

Figure 1:
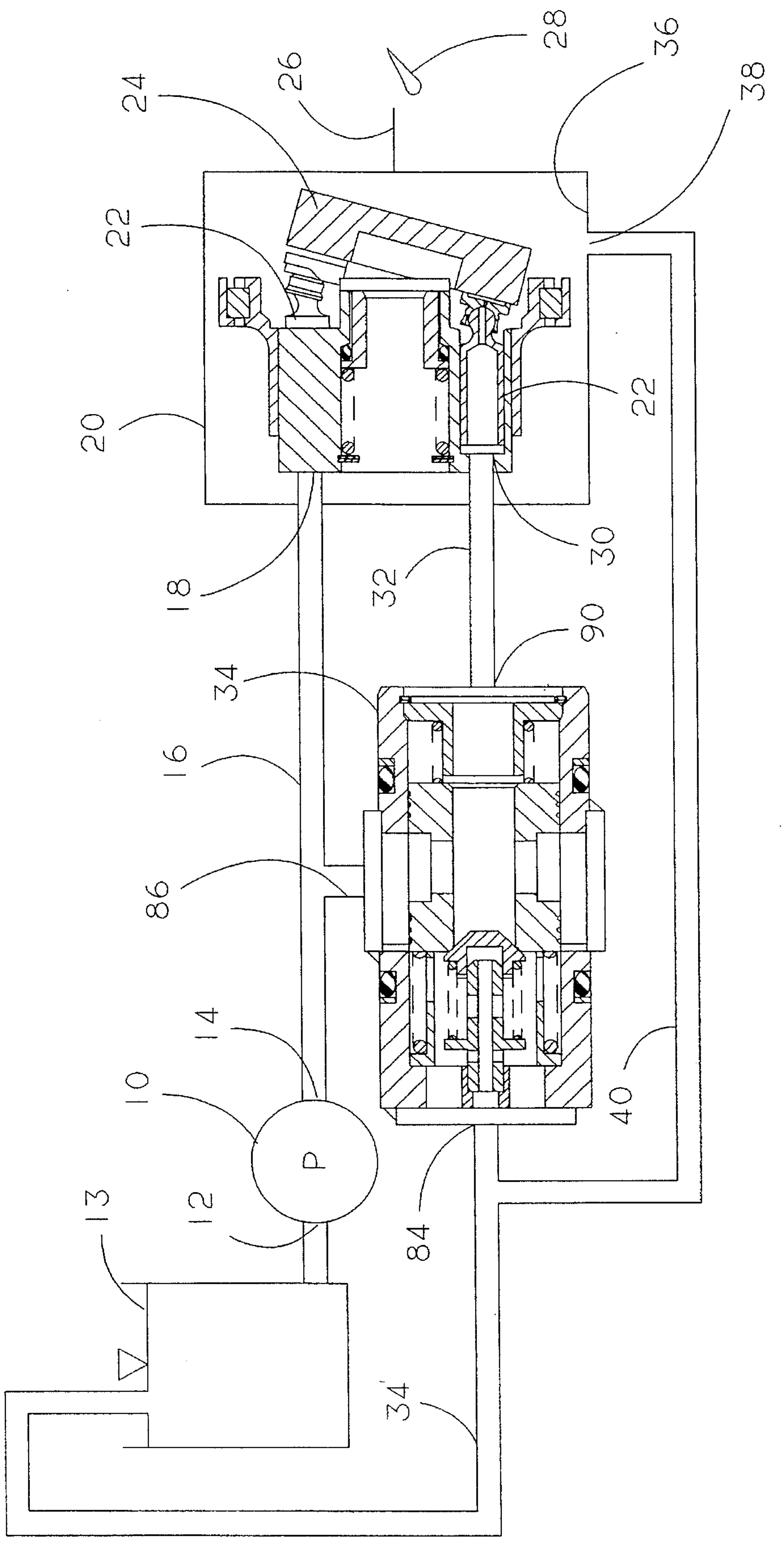
FIG. 1 is a flow diagram of a hydraulic system made according to the invention and practicing the method of preventing cavitation of the invention.

With reference to FIG. 1, a hydraulic system made according to the invention and practicing the method of the invention will be described. The system includes a supply pump 10 having an inlet 12 connected to the system reservoir 13 in which makeup hydraulic fluid is stored. The pump 10 has an outlet port 14 through which hydraulic fluid under pressure is pumped on a line 16. The line 16 is in turn connected to the so-called supply port 18 of a conventional hydraulic actuator in the form an axial piston motor (20). The motor 20 is conventional and includes a number of axially oriented pistons 22 which, when operated upon by pressurized hydraulic fluid, cooperate with a conventional wobbler or swash plate 24 to provide a rotary output on a shaft shown schematically at 26. When employed in an aircraft, the output on the shaft 26 is connected via any suitable and conventional means to, for example, a control surface shown at 28. In the usual case, the motor 20 will be of variable displacement and as a consequence, the rate at which the motor 20 is operative to move the load 28 will be controlled by the displacement of the motor 20 which may be selectively varied by a conventional control system as is well known.

The motor 20 includes a return port 30 which is connected via a conduit 32 to an anticavitation valve, generally designated 34, and made according to the invention. In the normal course of events, the valve 34 is operative to connect to the return port of the motor 20 and to the reservoir 13 via a conduit 34.

As is well known, in an axial piston motor, there is a certain amount of leakage of hydraulic fluid about the pistons 22 as well as some diversion of flow to create a hydrostatic, wear minimizing film on the wobbler 24. This hydraulic fluid is retained within the case 36 of the motor 20. To prevent buildup therein, the motor 20 includes a case port 38 which is connected via a line 40 to the line 34 (and thus the reservoir 13) just downstream of the valve 34.

Returning to the load 28, which is shown as an air foil serving as a control surface for an aircraft, the position of the same is adjusted by the motor 20 in response to conventional control inputs as is well known. It will be appreciated that air will be flowing about the load 28 and if the same is in a balanced or neutral position with respect to the air stream, movement of the air foil to any other position will be resisted by the air stream. In this situation, the highest system pressure seen by the motor will be at the supply port 18 while the lowest system pressure will be seen at the case port 38. A somewhat higher pressure than case pressure will be seen at the return port 30.

Once the air foil 28 reaches its commanded position, it will be subject to forces from the air stream urging the same to return to its balanced or neutral position. These forces will typically be successfully resisted within the system by conventional means and forces.

Figure 4:
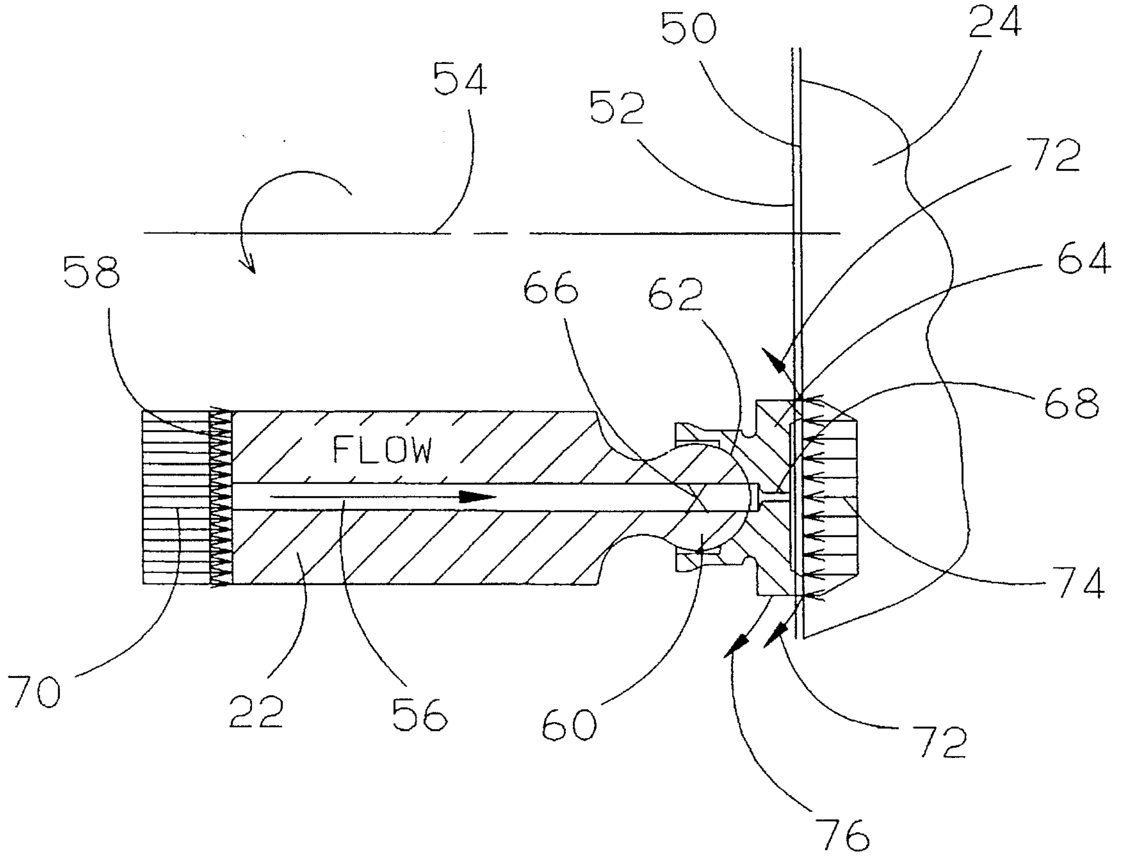
FIG. 4 is a vector diagram showing forces typically existent in the operation of an axial piston hydraulic motor.

However, if a further adjustment in the air foil 28 is desired and such adjustment is to return it toward the balanced or neutral position, it will be immediately appreciated that the forces acting upon the air foil 28 by the air stream will aid any force applied to the air foil 28 by the motor 20. This is referred to as a so-called "aiding load" situation and in some instances, the forces generated by the aiding load are so great that they tend to drive the pump 20 rather than vice versa. When such occurs, the pump 20, instead of acting as a motor, begins to act as a pump, taking in fluid at the return port 30 and pumping it out of the supply port 18. Because fluid is being drawn into the return port 30, pressure thereat will be reduced and, as noted previously, if the pressure is reduced sufficiently so as to approach the partial pressure of the hydraulic fluid in the line 32, the same will vaporize and cavitation and related occurrences will occur. In this situation, system pressure at the supply port 18 will still be high but, without more, pressure at the return port 30 will drop below case pressure at the port 38. This may lead to loss of hydrostatic film and slipper, tipping or hammering. These consequences maybe understood by reference to FIG. 4. Here, the wobbler 24 is fragmentarily shown to include a face 50 bearing a thin film 52 of hydraulic fluid for lubricating purposes. The rotational axis of the piston assembly is shown at 54 and one of the pistons at 22. In the typical case, each piston 22 will include a central conduit 56 which opens to the end 58 of the piston that is disposed within a cylinder to be subjected to pressurized fluid received at the supply port 18.

The opposite end 60 of each piston includes a spherical surface 62 which mounts a so-called slipper 64. The purpose of the spherical formation 62 is to provide a universal joint to allow the slipper 64 to abut and conform to the wobbler 24 for any position it may take during operation of the motor 20.

The slipper 64 is thus mounted for pivotal movement on the piston end 60 about the center 66 of the spherical surface 62.

The slipper 64 also includes a hydraulic fluid passage 68 which aligns with the passage 56 in the piston 22.

In the usual case, a force related to at least return pressure shown schematically by arrows 70 will be applied to the end 58 of the piston 22. Since we are talking about the usual case, return port pressure will be greater than case pressure and so hydraulic fluid will flow through the passages 56 and 68 to the interface of the slipper 64 and the wobbler 24 to form the hydrostatic film 52. This film emanates from the slipper 64 as illustrated by arrows 72 and thus will be at case pressure. Typically, the pressure responsive surface of the slipper 64 will be constructed so that when a pressure between case pressure and return pressure 70 and determined by the size of the passage 68 and the rate of leakage about the slipper 64, shown schematically by arrows 74 is acting thereagainst, the aforementioned flow through the passages 56 and 68 will be such as to maintain the hydrostatic film 52. The higher return pressure will also act to maintain the slipper 64 flush against the wobbler 24 thus avoiding hammering or tipping. However, in the extreme aiding load situation whereat the load begins to drive the motor 20, it will be appreciated that the pressure applied against the end 58 of the piston 22 will drop below case pressure when that particular piston 22 is in fluid communication with return port 30. As a result, a greater force will be acting on the slipper 64, urging the same to the left in FIG. 4 and the counteracting force acting against the piston surface 58, urging the piston 22 to the right against the wobbler 24. This, in turn, will prevent flow of hydraulic fluid through the passages 56 and 68 to generate the hydrostatic film 52 and the same will be lost, resulting in increased wear.

At the same time, the force holding the piston 22 and slipper 64 flush against the wobbler 24 will be more than counterbalanced with the consequence that the slipper 64 and the piston 22 with it, may move away from and out of complete contact with the wobbler 24.

Because the piston 22 and slipper 64 are rotating about the axis 54, and because the mass of the slipper 64 is clearly not acting through the point 66, the slipper 64 may pivot in the direction of an arrow 76 because it is no longer forced flush against the wobbler 24. This phenomena is known as "tipping" and results in point contact of an end of the slipper 64 with the wobbler 24 and can accelerate wear at the locations of such point contact.

In all events, continued rotation of the piston 22 and slipper 64 about the axis 54 will ultimately bring the end 58 of the piston 22 into fluid communication with the supply port 18 which, it will be recalled, is still at high pressure. The sudden pressurization of the piston end 58 will cause the piston 22 to be suddenly driven to the right as viewed in FIG. 4 causing the slipper to be almost instantaneously driven or "hammered" against the wobbler 24. This, too, is a highly undesirable occurrence particularly, since it is frequently preceded by the loss of the hydrostatic oil film 52 which normally provides some measure of protection for the slipper-wobbler interface.

According to the invention, where an aiding load comes into existence which is sufficient to drive the motor 20 by turning the same from a motor into a pump, the situation whereby the pressure at the return port 30 is reduced below the pressure at the case port 38 is avoided by recirculating fluid pumped from the supply port 18 by the motor 20 as it switches from a motor to a pump in response to the aiding load. In this way, high pressure fluid from the supply port is recirculated to the return port 30 to raise the pressure thereat. This in turn maintains the flow of hydraulic fluid through the passages 56 and 68 to maintain the hydrostatic film 52. In addition, it provides sufficient force against the piston end 58 to assure that the slipper 64 will not tip with respect to the wobbler 24 or otherwise separate therefrom so as to allow hammering when the piston end 58 ultimately is placed in communication with the supply port 18.

It will be appreciated that the same recirculation of hydraulic fluid to assure a relatively high pressure at the return port 30 will prevent the pressure from going so low as to approach the partial pressure thereat of the hydraulic fluid that would allow vapor to form to cause cavitation to occur.

This direction of fluid from the supply port 18 to the return port 30 is provided by the anti-cavitation valve 34. In a preferred embodiment, the valve 34 also causes some hydraulic fluid received from the pump 10 to mix with the recirculating hydraulic fluid from the supply port 18. The purpose of this is as follows. In system operation, the system control which forces the motor 20 to act as a pump, pumping fluid from the return port 30 to the supply port 18, is for the purpose of absorbing the energy provided by the aiding load to prevent the motor 20 from overspeeding. This in turn results in the heating of the hydraulic fluid within the motor 20 with a resulting rise in temperature. Conversely, fluid from the pump 10 will remain relatively cool and the mixing of fluid from both the pump 10 and the supply port 18 serves to dilute the temperature of the recirculating hydraulic fluid to prevent it from being overheated which could otherwise well occur since such fluid is being constantly recirculated through the motor 20, acquiring more heat with each pass.

The manner in which the foregoing is achieved by the anti-cavitation valve 34 will now be described with reference to FIGS. 1 and 2. Specifically, the valve 34 includes a valve body 80 fitted with an internal sleeve 82. The body 80 is provided with a first port 84 which is adapted to be connected to the line 32, a second port 86 opening to an annulus 88 at the interface of the body 80 in the sleeve 82 and a third port 90 at the end of the body opposite the port 84.

The sleeve includes an internal bore 92 and a spool 94 is moveable within the bore 92 toward and away from both of the ports 84 and 90. The spool 94 includes a generally central annular groove 96 which is flanked by two lands 98 and 100. The spool 94 also includes a central hollow 102 extending from one end 104 of the spool 94 to the opposite end 106. Radially extending passages 108 establish fluid communication between the groove 96 and the hollow 102.

At the spool end 104, a valve seat 110 is provided about the hollow 102. A poppet 112 is located within the body 80 as well as within the sleeve 82 and is reciprocally mounted on an end 114 of a spring seat 116 aligned with the port 84. A spring 118 extends between the spring seat 116 and the poppet 112 oppositely of the seat to bias the poppet 112 toward a closed position against the seat 110.

When the poppet 112 is moved away from the seat 110, a passage including the hollow 102 and the spool 94 is established between the first and third ports 84 and 90.

Returning to FIG. 1, the third port 90 is connected to the return port 30 of the actuator 20 while the first port 84 is connected to the reservoir 13. As a consequence, it will be appreciated that in normal operation, the pressure differential between the pressure at the return port 30 and the pressure at the case port 38 will be set in part by a spring 118. This is due to the fact that return port pressure will be directed against a pressure responsive surface 120 of the poppet 112 via the hollow 102 and the spool 94. Only when the pressure acting against the surface 120 is sufficiently above the closing force acting on the poppet 112, which will be the sum of the force provided by the spring 118 and whatever pressure is present at the port 84, will be the poppet 112 leave its seat 110 allowing flow from the return port 30 to the reservoir 13.

Figure 2:
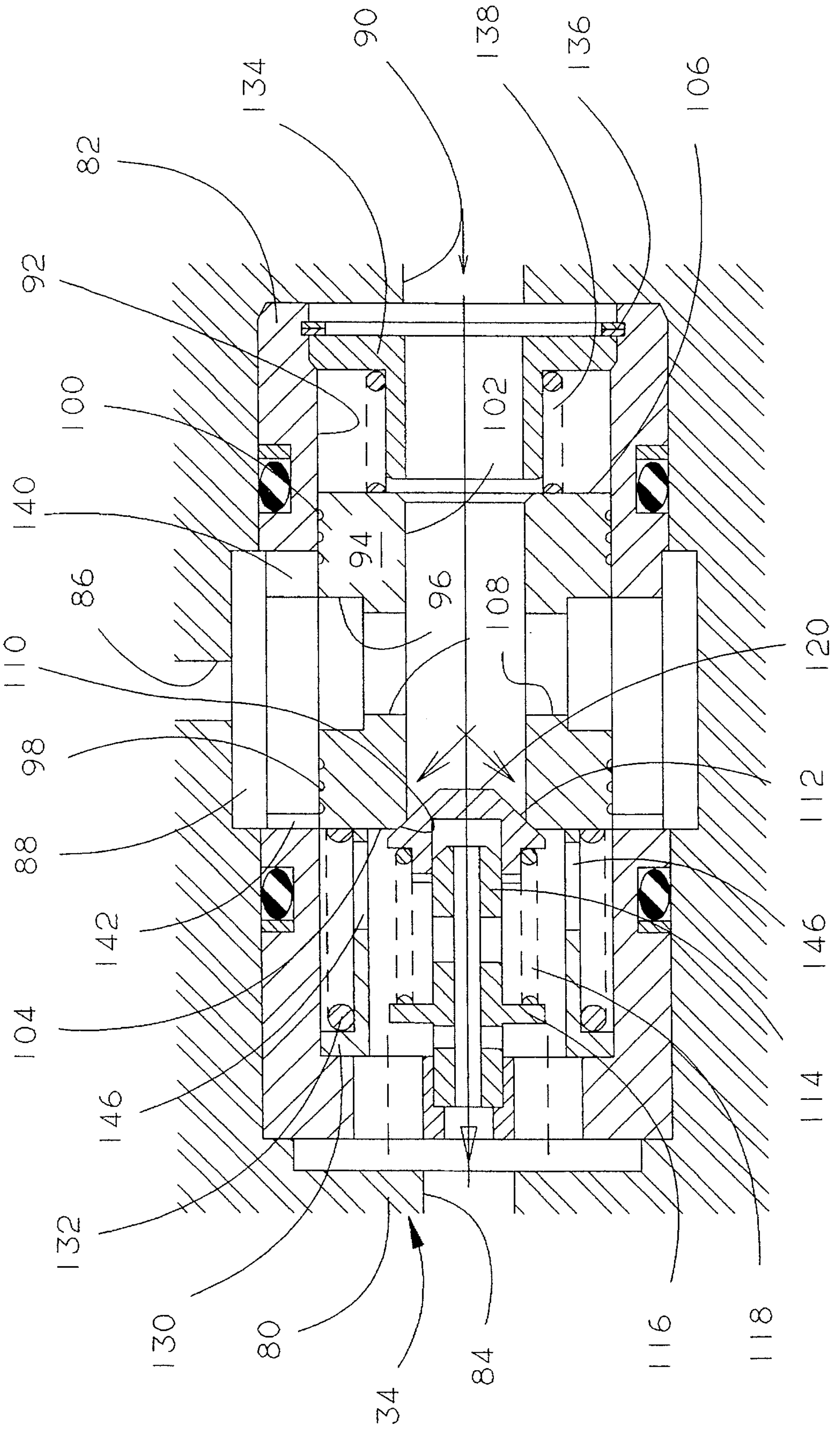
FIG. 2 is a sectional view of a valve employed in the system to cause the same to practice the method of the invention.

A further sleeve-like spring seat 130 is located within the bore 92 toward the end thereof adjacent the first port 84 and mounts a compression coil spring 132 which acts against the end 104 of the spool 94 to bias the same toward the right as viewed in FIG. 2. At the opposite end of the bore 92, adjacent the third port 90, a further spring seat 134 is held in place by a conventional lock ring 136 and mounts a compression coil spring 138 acting against the end 106 of the spool 94. It will further be appreciated that in addition to the forces exercised by the springs 132 and 138, the spool 94 is subject to the force of the spring 118 when the poppet 112 is closed against the seat 110. Further, the pressure of fluid within the sleeve 82 adjacent the end 104 of the spool 94 will be acting against the spool 94 tending to move the same to the right while pressure within the sleeve 82 adjacent the end 106 will be acting against the spool 94 tending to move the same to the left.

The valve 34 further includes one or more radially passages 140 extending from the annulus 88 to the bore 92 and normally closed by the land 100 on the spool 94 and a reduced-size radial passage 142 that likewise extends from the annulus 88 to the bore 92. The passage 142 is normally closed by the land 98. Because of its reduced size as compared to the size of the passage 140, it acts as a restriction in a flow path from the annulus 88 to the bore 92.

In normal operation, when an aiding load sufficient to cause the motor 20 to act as a pump is not present, the various components of the valve 34 will assume the positions illustrated in FIG. 2 except that the poppet 112 will have moved to the left away from the seat 110 to allow hydraulic fluid from the return port 30 to flow through the valve 34 ultimately to the reservoir 114. At this time, the second port 86 will be blocked as the passages 140 and 142 associated therewith will be blocked by the lands 100 and 98, respectively, on the spool 94.

Should an aiding load come into existence and be of a magnitude so that the motor 20 begins to act as a pump, it will be appreciated that the resulting suction at the return port 30 will result in a lowering of pressure thereat. This, in turn, means that the pressure at the port 90 of the valve 34 will be reduced. As a consequence, the pressure acting against the surface 120 of the poppet 112 will no longer maintain the same pressure as in an open condition and it will close. Pressure at the port 84 will remain the same and with the reduction of pressure applied against the end 106 of the spool 94, a pressure imbalance will occur causing the spool 94 to shift to the right. The groove 96 in the spool 94 will begin to open to the passage 140 while the end 104 of the spool 94 will begin to open to the passage 142. As a result, because the port 86 is connected to the line 16, high pressure fluid will ultimately enter the groove 96 and be directed through the radial bores 108 and the hollow 102 to the port 90 to provide fluid thereto and pressure thereat will be elevated. This elevation of pressure at the return port 30 will prevent cavitation as well as loss of the hydrostatic film on the wobbler, tipping or hammering.

The purpose of the passage 142 is to allow a certain amount of the hydraulic fluid entering the second port 86 from the supply port 18 which is to be recirculated to the return port 30 to be sacrificially vented to the reservoir via the part of the bore 92 to the left of the spool end 104. In this regard, the spring seat 130 is provided with a series of apertures 146 to allow fluid flowing through the passage 142 to achieve access to the port 84 and thus the reservoir 13.

Because a certain amount of the flow from the supply port 118 is directed via the passage 142 to the reservoir, flow into the port 86 must exceed the flow out of the port 90 and the excess is taken from the outlet 14 of the pump 10.

The fluid from the pump 10 will be relatively cool in comparison to the fluid from the supply port 18 which will have its temperature elevated as a result of absorption of energy imparted to it for the purpose of preventing overspeeding of the motor 20 in response to the aiding load. This, in turn, means that relatively cool fluid from the pump 10 will mix with hot fluid from the supply port 18 beginning at the port 86 to achieve temperature dilution of the fluid. This in turn prevents the fluid from over-heating as it is continually recirculated through the motor 20 during the aiding load situation.

Figure 3:
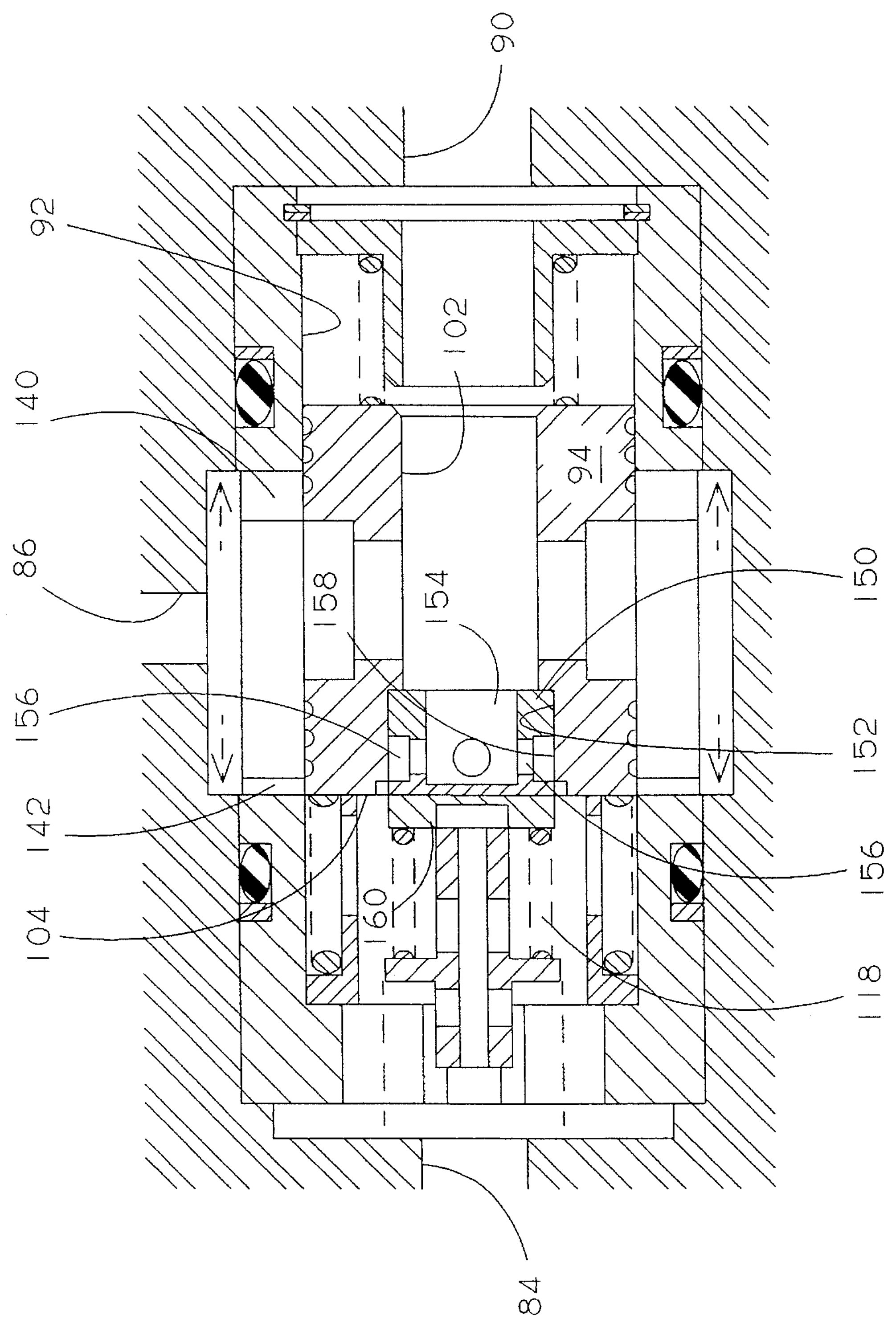
FIG. 3 is a sectional view of a modified embodiment of the valve.

In some instances, it may be desirable to utilize a valve other than the poppet 112. FIG. 3 shows an alternative embodiment wherein the poppet 112 is replaced by a slide valve 150. The slide valve is reciprocally received in an enlarged diameter portion 152 of the hollow 102 in the spool 94. The slide valve 150 includes an axial passage 154 extending to a plurality of radial passages 156 and, like the poppet 112, has a compression coil spring 118 biasing the slide valve 150 into the enlarged diameter portion 152 so that the radial bores 156 are closed off by an edge 158 of the enlarged diameter portion 152. As with the spool 112, the right-hand side of the slide valve 150 is responsive to pressure within the hollow 102 of the spool 94 while the opposite side 160 is subject to pressure imparted by the spring 118 and the pressure of any fluid within the bore 92 and to the left of the spool end 104.

By appropriately sizing the passages 140 and 142, the pressure differential between the return port 30 and the case port 38 will be determined. The system is always set to assure that pressure at the return port 30 will always be higher than the partial pressure of the fluid to prevent cavitation from occurring.

From the foregoing, it will be appreciated that the method of the invention assures that cavitation in an axial piston pump as a result of an aiding load, and the related occurrences of loss of hydrostatic film, slipper tipping and hammering can be avoided. As a consequence, increased reliability in two-line hydraulic systems may be achieved. This is particularly advantageous in aircraft where such systems are utilized extensively for weight reduction purposes since enhanced reliability reduces downtime required for periodic repair and thus maximizes the availability of aircraft for such purposes as they are to be put.

I claim:

1. In a hydraulic system including a fluid reservoir, a hydraulic supply pump connected to the reservoir, an axial piston hydraulic motor adapted to drive a load or be driven by a load and including supply return and case ports, the supply port being connected to said pump, the case port being connected to said reservoir and the return port being connectable to said reservoir, means for preventing cavitation in said motor when said motor is being driven by a load and comprising:

first means for connecting said return port to said reservoir when pressure at said return port exceeds pressure at said case port by a predetermined amount; and second means for connecting said return port to said supply port when pressure at said case port exceeds pressure at said return port.

2. The hydraulic system of claim 1 wherein said second means is further operable to connect said return port to said pump when pressure at said case port exceeds pressure at said return port.

3. The hydraulic system of claim 1 wherein said first and second means are first and second valves.

4. The hydraulic system of claim 3 wherein said valves are combined in a single structure.

5. The hydraulic system of claim 4 wherein said first valve is a popper having opposed pressure responsive surfaces and said second valve is a spool having opposed pressure responsive surfaces.

6. The hydraulic system of claim 5 wherein said spool includes a valve seat for said poppet.

7. The hydraulic system of claim 6 wherein said spool and said popper may operate to connect both said supply port and said return port to said reservoir.

8. The hydraulic system of claim 4 wherein said single structure comprises a valve housing having a first port connected to said return port, a second port connected to said pump and to said supply port; and a third port connected to said case port and to said reservoir; a bore with said housing and extending to said first, second and third ports; said second valve comprising a hollow spool within said bore and movable between positions blocking and opening said second port to respectively close or open a flow path between said first and second ports, said hollow spool and said bore defining a passage within said housing between said second and third ports, and said first valve comprising a poppet for opening and closing said passage and means normally urging said poppet to close said passage.

9. The hydraulic system of claim 8 wherein said passage includes a valve seat for said poppet and located on said spool.

10. The hydraulic system of claim 8 wherein said spool further respectively closes or opens a further flow path between said first and third ports, and further including a restriction in said further flow path.

11. A method of preventing cavitation in a hydraulic motor of the axial piston type having a supply port and a return port and operable to act as a pump when subject to an aiding load, comprising the step of:

recirculating hydraulic fluid from said supply port to said return port when said motor is subject to an aiding load.

12. The method of claim 11 further including the additional step of mixing hydraulic fluid from a supply pump with the recirculated hydraulic fluid.

13. The method of claim 12 wherein said additional step is performed prior to the admission of the recirculated hydraulic fluid to the return port so as to prevent cavitation in the fluid supplied to the return port.

* * * * *